No. 887,967. PATENTED MAY 19, 1908.
H. A. SCHERMERHORN.
AUXILIARY SEAT FOR VEHICLES.
APPLICATION FILED NOV. 14, 1907.

2 SHEETS—SHEET 1.

Witnesses:
Chas. E. Gorton
M. A. Nyman

Inventor:
Herschel A. Schermerhorn
By Chas. C. Gillman
Attys.

No. 887,967. PATENTED MAY 19, 1908.
H. A. SCHERMERHORN.
AUXILIARY SEAT FOR VEHICLES.
APPLICATION FILED NOV. 14, 1907.
2 SHEETS—SHEET 2.
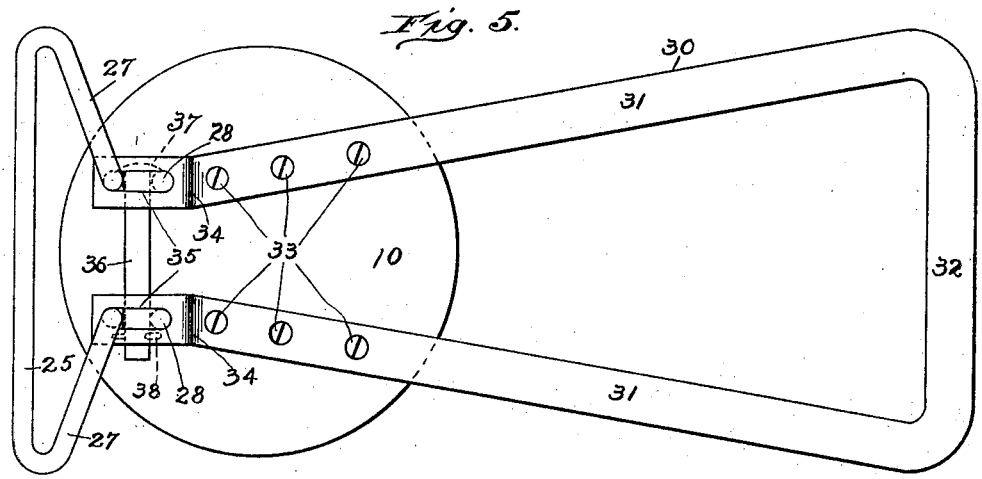
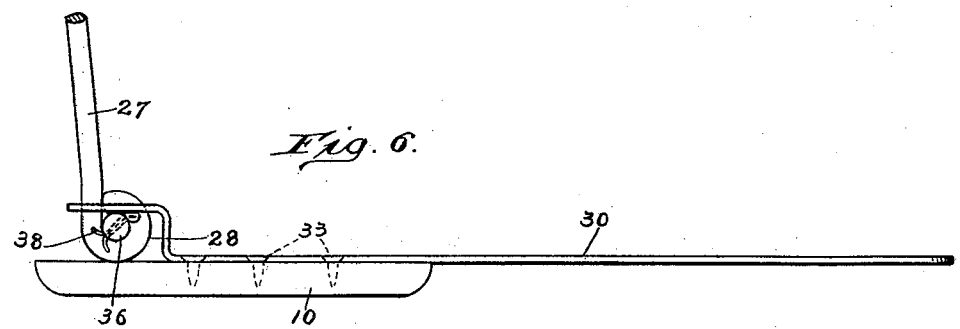
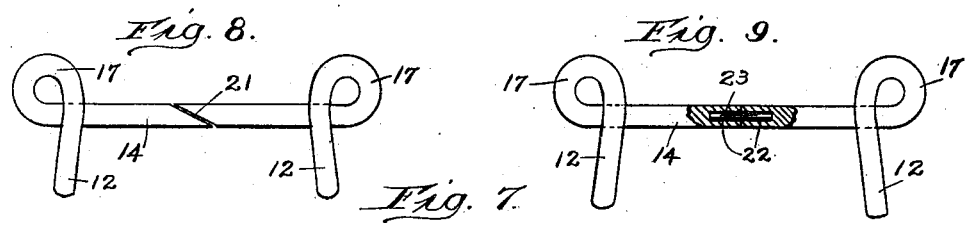
Witnesses:
Chas. E. Gorton.
M. A. Nyman.
Inventor
Herschel A. Schermerhorn.
By Chas. C. Tillman Atty

UNITED STATES PATENT OFFICE.

HERSCHEL A. SCHERMERHORN, OF SHABBONA GROVE, ILLINOIS.

AUXILIARY SEAT FOR VEHICLES.

No. 887,967.  Specification of Letters Patent.  Patented May 19, 1908.

Application filed November 14, 1907. Serial No. 402,068.

*To all whom it may concern:*

Be it known that I, HERSCHEL A. SCHERMERHORN, a citizen of the United States, residing at Shabbona Grove, in the county of Dekalb and State of Illinois, have invented certain new and useful Improvements in an Auxiliary Seat for Vehicles, of which the following is a specification.

This invention relates to improvements in a collapsible or folding seat, and while it is more especially intended to be used as an auxiliary seat for vehicles, such as buggies, automobiles, and other pleasure conveyances yet it can be used separately as a seat or stool; and it consists in certain peculiarities of the construction, novel arrangement, and operation of the various parts thereof, as will be hereinafter more fully set forth and specifically claimed.

The object of my invention is to provide a folding seat of the above-named character, which shall be simple and inexpensive in construction, strong, durable and effective in operation, and so made that when not in use, its parts may be folded together into a compact form so as to be placed under the seat of the vehicle, or, out of the way.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1:
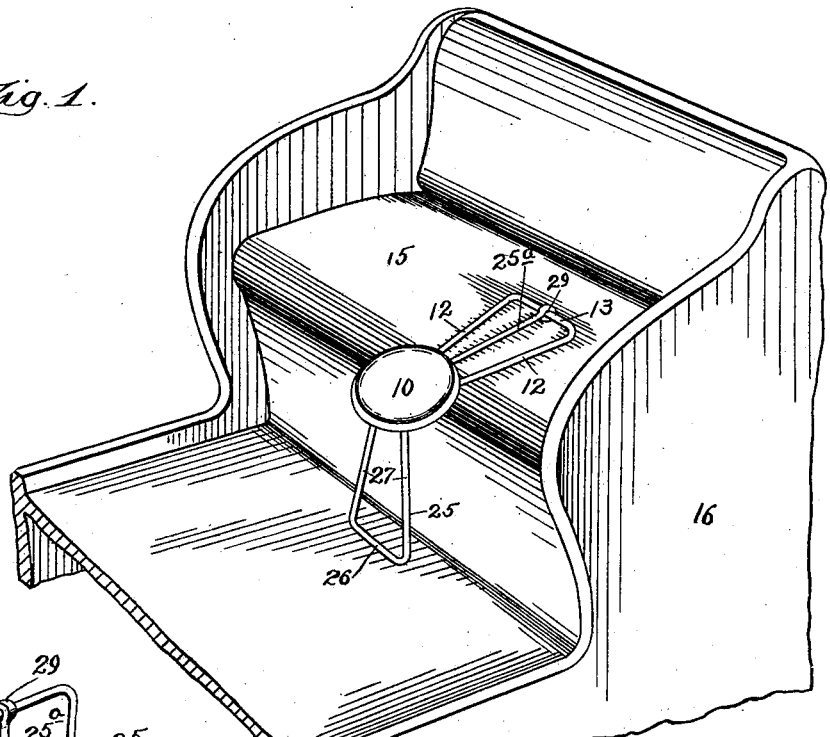
Figure 2:
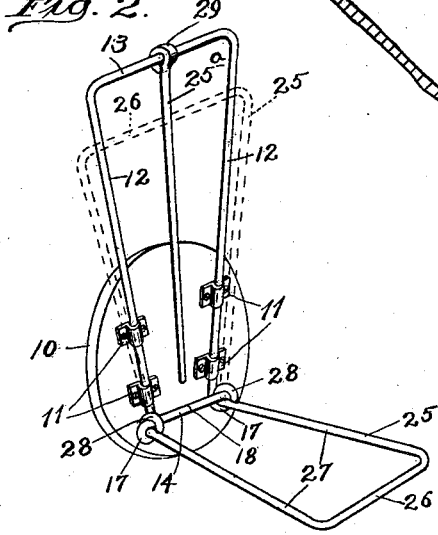
Figure 3:
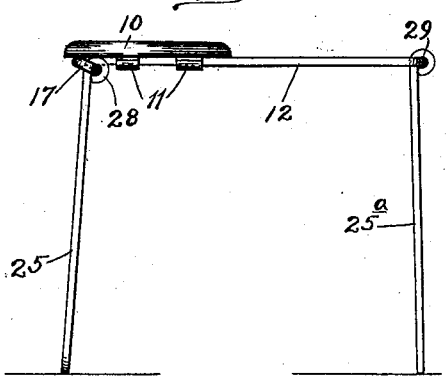
Figure 4:
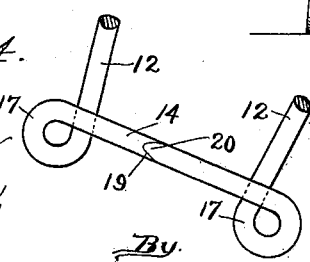

Figure 1 is a perspective view of a portion of the body of a vehicle, such as a buggy or automobile, showing an auxiliary seat embodying one form of the invention in about the position it will occupy when ready for use. Fig. 2 is a perspective view of the lower surface of the seat, showing by continuous lines the supporting frame and supporting leg therefor in their extended positions, or those positions they will occupy when the seat is in use, and by dotted lines the positions they will occupy when folded. Fig. 3 is a side view in elevation of the seat, showing the manner in which it may be used as a stool or separate from the vehicle. Fig. 4 is a perspective view of a portion of the supporting frame, showing one manner of joining its members together. Fig. 5 is a bottom plan view of a seat, illustrating a modification in the construction of the supporting frame thereof. Fig. 6 is a view in side elevation of the construction illustrated in Fig. 5, showing the seat inverted and a portion only of the supporting leg. Figs. 7, 8 and 9 are detail views of a portion of the supporting frame, showing modifications in the manner of securing the same together.

Like numerals of reference, refer to corresponding parts throughout the different views of the drawings.

The reference numeral 10 designates the seat, which may be made of any suitable size, form and material, but preferably of wood and circular in shape, and has secured on its lower surface by means of clips 11, or otherwise, a supporting frame, which is preferably made of a single metal rod bent to form two side members 12, a transverse portion 13 at its rear end, and a like portion 14 at its front end, or that end thereof which is located beneath the seat 10, as will be readily understood by reference to the drawings.

The side members or portions 12, as shown in Figs. 1 and 2, are located substantially in parallelism with one another, yet are slightly contracted or brought towards each other at their front ends, thus making the supporting frame for the seat somewhat wider at its rear portion to afford a greater supporting surface to rest on the cushion 15 of the vehicle body 16, and thereby prevent tendency of the seat 10 to tilt to either side of the frame. The front portion of each of the members 12 is provided with a transverse portion 14 by being bent or formed with loops 17 near their front ends, which loops extend outwardly of the members 12 and then rearwardly and downwardly when the seat is in position for use, as is clearly shown in Figs. 3 and 4 of the drawings.

In order that the portion 14 at the front part of the supporting frame for the seat may be more readily bent crosswise with respect to the members 12, I prefer to make the joint 18 of the piece out of which the supporting frame is formed about midway of the transverse portion 14, and may simply allow the ends of the transverse portion 14 to meet, as shown at 18 in Fig. 2, or may provide one of said ends with a recess 19 to receive an extension 20 on the other end, (see Fig. 4), in which case the meeting ends of the transverse portion 14 may be welded, if desired.

In some instances, as shown in Fig. 8, the transverse portion 14 at the forward part of the supporting frame for the seat may be diagonally divided as at 21 at about its middle, when the meeting ends of the transverse portion will abut against each other, as is apparent.

Sometimes I may divide the transverse portion 14 at its middle, and provide each of its adjacent ends with a longitudinally extending socket 22, in which may be located a pin or rod 23 used for holding them together, as shown in Fig. 9 of the drawings.

Instead of forming the piece out of which the supporting frame for the seat is formed with its joint in the front transverse portion, I may form said joint in the rear transverse portion 13, as shown at 24 in Fig. 7, and omit the joint in the front transverse portion. However, I do not wish to be understood as limiting myself to the location of the joint in the supporting frame for the seat, nor do I wish to be understood as limiting myself in the manner of joining the meeting ends thereof, as they may or may not be welded together, or, may be formed or united in the above-named or any well-known way, without departing from the spirit of my invention.

A supporting leg 25, which is preferably made of a single rod or piece of metal bent to form a lower transverse portion 26 and two upright side members 27, is employed in conjunction with the supporting frame above-described to support the seat 10 in its position for use, as shown in Figs. 1 and 3 of the drawings. The upright side members 27 of the supporting leg 25 are extended at their upper ends through the loops 17 at the front end of the supporting frame, and each of the members 27 is formed with a loop 28 to encircle the transverse portion 14, which thereby becomes a pintle for the loops or eyes 28 on the leg 25 to turn on. As the upper ends of the members 27 of the supporting leg are extended through the loops 17 of the supporting frame and are located outwardly of the members 12 of said frame, it is apparent that the members 27 will be prevented slipping towards each other, and will also be locked when turned to substantially a vertical position by means of the front portions of the loops 17 on the supporting frame, yet said leg will be permitted to turn or move forwardly to the folded position, shown by dotted lines in Fig. 2 of the drawings.

In order to render the seat available as a stool or separate from a vehicle, I may sometimes provide the transverse portion 13 of the supporting frame for the seat with a leg 25ª, which is formed at its upper end with a loop 29 to loosely engage the transverse portion 13 at about its middle, so that said leg may be turned to substantially a vertical position, as shown in Fig. 3, when it and the leg 25 will support the seat 10 in a position to be occupied, as is apparent. Of course, I may omit the leg 25ª, but as it is loosely secured to the transverse portion 13 of the supporting frame for the seat, it is apparent that it will not interfere with the operation of the seat when used in connection with a vehicle, but may be readily employed to assist in properly supporting the seat separately.

In Figs. 5 and 6 of the drawings I have shown a modification in the construction of the seat, which consists in employing a supporting frame 30 for the seat, which is made of a single flat piece of metal bent to form two side members 31, and a transverse rear portion 32 to rest on the cushion 15 of the vehicle seat. The side members 31 of this modified form of the supporting frame are brought towards each other at their front ends, and are rigidly secured to the seat 10 by means of screws 33, or otherwise. The free end of each of the members 31 is bent to depend from the seat 10 as at 34 (see Fig. 6), and is provided with a longitudinal slot 35, through which the loops 28 on the upper ends of the upright members 27 of the supporting leg 25 are extended. Located transversely of the front ends of the side members 31, and passing through the loops 28, is a rod or pintle 36, which has at one of its ends a head 37 and at its other end a key 38 located in a suitable opening in the rod, which head and key will prevent its dislocation.

From the above description of my improvements, it will be seen that the improved seat constructed according to my invention is of an extremely simple and inexpensive nature, and is especially well adapted for use by reason of its simplicity and convenience, and that the device may be readily rendered for use by turning the supporting-leg 28 from the position shown by dotted lines in Fig. 2 to that shown by continuous lines in said figure, when said leg will be adapted to rest at its lower end on the floor of the vehicle, while the supporting-frame for the seat will be adapted to lie on the cushion 15, thus supporting the seat 10 somewhat in front of the cushion 15 and on about a level therewith.

When it is desired to use the seat as a stool or separately from a vehicle, it is evident that all that is necessary is to turn the supporting-leg 25ª on the supporting-frame to substantially a vertical position, as is clearly shown in Fig. 3 of the drawings.

It will also be evident from the above description that the device is susceptible of considerable modification without material departure from the principles and spirit of the invention, and for this reason I do not desire to be understood as limiting myself to the precise form and arrangement of the several parts of the device as herein set forth in carrying out my invention in practice.

Having thus fully described my invention, what I claim as new, and desire to secure by Letters-Patent, is—

1. The combination with a seat, a supporting-frame therefor rigidly secured thereto and comprising a single piece provided with rearwardly divergent side members having a transverse portion uniting said members at their rear ends, the front end of each of said side members having a loop and a transverse portion uniting said loops, a supporting-leg comprising a single piece having downwardly divergent upright members and a transverse portion uniting said members at their lower ends, each of said upright members having a loop on its upper end, said loops extended into the loops of the side members of the supporting-frame and engaging the front transverse portion thereof.

2. The combination with a seat, of a supporting-frame therefor rigidly secured thereto and projecting at its rear portion from the seat and comprising a single piece having side members provided with a transverse portion uniting said members at their rear ends, a transverse piece uniting the front ends of the side members, a supporting-leg pivotally secured at its upper end to said front transverse portion and comprising a single piece having downwardly divergent upright members and a transverse portion uniting said members at their lower ends, and a leg pivotally secured at its upper end to the rear transverse portion of the supporting-frame.

HERSCHEL A. SCHERMERHORN.

Witnesses:
RALPH SCHERMERHORN,
CLYDE S. MORSE.